(12) United States Patent
Goetz et al.

(10) Patent No.: US 11,587,014 B1
(45) Date of Patent: Feb. 21, 2023

(54) RIDE SHARING WITH CASH DELIVERY

(71) Applicant: Wells Fargo Bank, N.A., San Francisco, CA (US)

(72) Inventors: Darren M. Goetz, Salinas, CA (US); Julio Jiron, San Bruno, CA (US); JoAnn Mar, San Francisco, CA (US); Dennis E. Montenegro, Concord, CA (US); Joseph Ng, San Mateo, CA (US); Damodar Raval, San Francisco, CA (US); Lisa Schur, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 155 days.

(21) Appl. No.: 16/660,644

(22) Filed: Oct. 22, 2019

(51) Int. Cl.
*G06Q 10/08* (2012.01)
*G06Q 10/083* (2023.01)

(52) U.S. Cl.
CPC .................. *G06Q 10/083* (2013.01)

(58) Field of Classification Search
CPC ................................................... G06Q 10/083
See application file for complete search history.

(56) References Cited

U.S. PATENT DOCUMENTS

| 7,475,809 | B2 | 1/2009 | Romary |
| 10,139,824 | B2 | 11/2018 | Sako et al. |
| 10,248,935 | B2 | 4/2019 | DeLuca et al. |
| 10,504,077 | B1* | 12/2019 | Hu ............................ G07F 9/08 |
| 2002/0184150 | A1* | 12/2002 | Wong .................. G06Q 20/108 |
| | | | 705/42 |
| 2004/0215564 | A1* | 10/2004 | Lawlor ............. G06Q 30/0255 |
| | | | 705/40 |

(Continued)

FOREIGN PATENT DOCUMENTS

| CN | 203995883 U | 12/2014 |
| EP | 1 265 201 A1 | 12/2002 |

(Continued)

OTHER PUBLICATIONS

Murali, S., "Mobile ATM comes as boon to farmers," The Hindu, Chennai, Feb. 27, 2019.*

(Continued)

*Primary Examiner* — Nathan Erb
(74) *Attorney, Agent, or Firm* — Foley & Lardner LLP

(57) ABSTRACT

A method comprises receiving a cash level indicator from a third-party server. The cash level indicator indicates an amount of cash in each of a plurality of cash storage devices, where the plurality of cash storage devices receive cash from a plurality of delivery agents. Each of the cash storage devices is arranged within or on a vehicle operated by one of the plurality of delivery agents. The method further comprises receiving a cash request from a user device. The method also includes selecting one of the plurality of cash storage devices based on the cash level indicator and location data of delivery agent devices of the delivery agents. The method also comprises sending a message comprising location data of the user device, the selected delivery agent device being one of the delivery agent devices, wherein the selected cash storage device is associated with the selected delivery agent device.

24 Claims, 8 Drawing Sheets

(56) References Cited

U.S. PATENT DOCUMENTS

| | | | |
|---|---|---|---|
| 2014/0180959 A1* | 6/2014 | Gillen | G01S 19/14 |
| | | | 705/341 |
| 2016/0078417 A1* | 3/2016 | DeLuca | G06Q 20/3224 |
| | | | 701/23 |
| 2018/0336508 A1* | 11/2018 | Cantley | G06Q 10/083 |
| 2018/0376277 A1* | 12/2018 | Dudhmahl | H04L 63/08 |
| 2020/0302755 A1* | 9/2020 | Edwards | G06V 10/235 |

FOREIGN PATENT DOCUMENTS

| | | | | |
|---|---|---|---|---|
| JP | 2001-155251 A | 6/2001 | | |
| JP | 568768 B2 | 3/2018 | | |
| WO | WO 2018/026733 A1 * | 2/2018 | | G01M 17/00 |

OTHER PUBLICATIONS

"This Food Truck has an ATM built into the side of it", https://www.reddit.eom/r/pics/comments/67riwi/this_food_truck_has_an_atm_built_into_the_side_of/ 5 pages.

Oliver, Claire, "Food Truck Hauls Around Its Own ATM", https://www.dnainfo.com/new-york/20130812/soho/food-truck-hauls-around-its-own-atm/ Aug. 12, 2013. 7 pages.

* cited by examiner

RIDE SHARING WITH CASH DELIVERY

BACKGROUND

Typically, to withdraw cash associated with a user's account, the user must go to a location where cash can be withdrawn from a cash withdrawal system (e.g., an automated teller machine, a grocery store, etc.). The user provides authenticating information (e.g., a passcode, etc.) to verify the user with the cash withdrawal system, and the cash withdrawal system provides cash to the user.

SUMMARY

In one arrangement, a method comprises receiving, by a provider institution computing system via a network, a cash level indicator from a third-party server. The cash level indicator indicates an amount of cash stored in each of a plurality of cash storage devices, where the plurality of cash storage devices receive cash from a plurality of delivery agents. Each of the plurality of cash storage devices is arranged within or on a vehicle operated by a corresponding one of the plurality of delivery agents. The method further comprises receiving, by the provider institution computing system via the network, a cash request from a user device of a user. The method also includes selecting, by the provider institution computing system, one of the plurality of cash storage devices based on the cash level indicator and location data of a plurality of delivery agent devices of the plurality of delivery agents. The method also comprises sending, by the provider institution computing system to a selected delivery agent device, a message comprising location data of the user device, the selected delivery agent device being one of the plurality of delivery agent devices, wherein the selected cash storage device is associated with the selected delivery agent device.

In another arrangement, a provider institution computing system comprises a network interface, and a processing circuit. The processing circuit is configured to receive a cash level indicator from a third-party server. The cash level indicator indicates an amount of cash stored in each of a plurality of cash storage devices, where the plurality of cash storage devices receive cash from a plurality of delivery agents. Each of the plurality of cash storage devices is arranged within or on a vehicle operated by a corresponding one of the plurality of delivery agents. The processing circuit is further configured to receive a cash request from a user device of a user and select one of the plurality of cash storage devices based on the cash level indicator and location data of a plurality of delivery agent devices of the plurality of delivery agents. The processing circuit is further configured to send a message to a selected delivery agent device, the message comprising location data of the user device, the selected delivery agent device being one of the plurality of delivery agent devices, wherein the selected cash storage device is associated with the selected delivery agent device.

In a further arrangement, a system for processing cash withdrawal and delivery requests, comprises a non-transitory computer-readable medium of a provider institution financial system storing computer-readable instructions such that, when executed, causes a processor to receive a cash level indicator from a third-party server. The cash level indicator indicates an amount of cash stored in each of a plurality of cash storage devices, where the plurality of cash storage devices receive cash from a plurality of delivery agents. Each of the plurality of cash storage devices is arranged within or on a vehicle operated by a corresponding one of the plurality of delivery agents. The system further causes the processor to receive a cash request from a user device of a user and select one of the plurality of cash storage devices based on the cash level indicator and location data of a plurality of delivery agent devices of the plurality of delivery agents. The system also causes the processor to send a message to a selected delivery agent device, the message comprising location data of the user device, the selected delivery agent device being one of the plurality of delivery agent devices, wherein the selected cash storage device is associated with the selected delivery agent device.

These and other features, together with the organization and manner of operation thereof, will become apparent from the following detailed description when taken in conjunction with the accompanying drawings.

DETAILED DESCRIPTION

Figure 1:
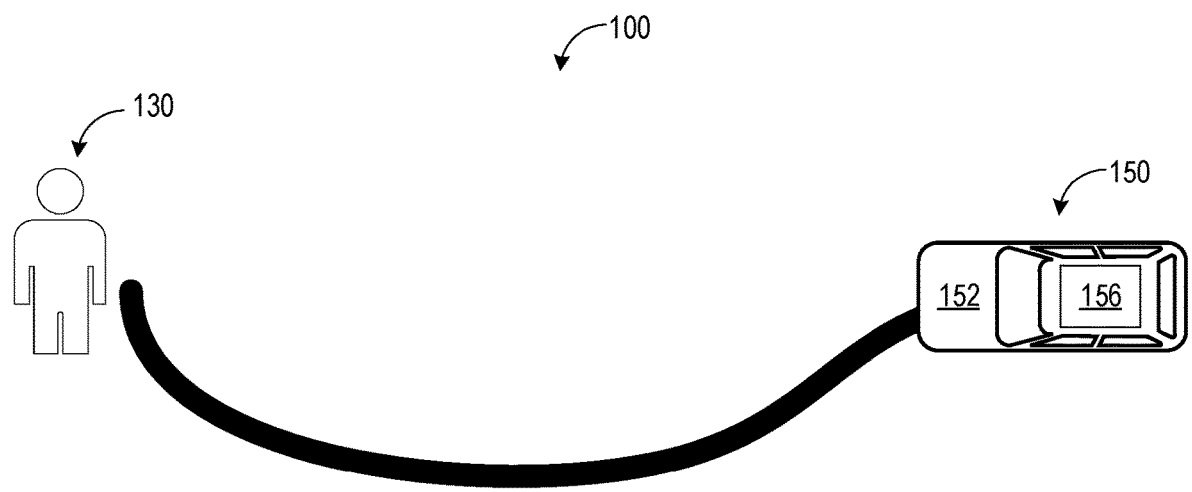
FIG. 1 is an illustration of a cash delivery method, according to some arrangements.

Referring generally to the FIGS., arrangements described herein relate to systems, methods, and non-transitory computer-readable media for providing cash to a user from a third party. In some arrangements, a provider financial institution computing system communicates with a user, a delivery agent, and a third party to arrange for the user to receive cash from the third party.

The user has a user device (e.g., a mobile phone, tablet computer, etc.) that executes a mobile application provided by a mobile application server (e.g., a third-party server). The delivery agent has a delivery agent device (e.g., a mobile phone, tablet computer, etc.) that executes the mobile application. The delivery agent has a cash storage device located in, or on, a delivery agent vehicle that communicates with the provider institution computing system and/or the mobile application. The provider institution computing system communicates with the third-party server and the cash storage device.

The user can use the mobile application to request cash, and the provider institution computing system sends the cash request to one or more delivery agents via the third-party server and the mobile application. The provider institution computing system receives information from the cash storage device related to the amount of cash available in the cash storage device or in the possession of the delivery agent, the denominations of cash available, the currency available, and the status of the cash storage device (e.g., open, closed, etc.). The provider institution computing system may send the cash request to the one or more delivery agents based on the locations of the one or more delivery agent devices relative to the user device and the cash storage device from which the cash will be withdrawn. At least one of the delivery agents accepts the cash delivery request via the mobile application, and the provider institution computing system provides the locations of the cash storage device and the user device to the delivery agent device. The provider institution computing system may provide an authentication codes to the user device to verify the transaction. The mobile application can provide the delivery agent device with directions to navigate to the user device. The cash storage device sends authentication information to the provider institution computing system to verify the cash withdrawal upon providing cash to the user or receiving cash from the delivery agent. The provider institution computing system may notify the third-party server when the cash storage device receives cash from the delivery agent such that the delivery agent can receive rewards for replenishing cash in the cash storage device.

Arrangements described herein optimize resources (e.g., the delivery agent or the cash storage device may have an abundance of cash that can be used instead of sitting idle at a stationary cash withdrawal system). For example, the systems and methods described herein provide a location-based and availability-based mobile application and process that connect the user device, the delivery agent devices, the third-party server, and the provider institution computing system. By implementing a centralized management system (e.g., the provider institution computing system) that monitors, in real time or in near real time, the locations of the user device, the delivery agent devices, and the cash storage devices, as well as the cash levels and status of the cash storage devices, the arrangements described herein automate a cash delivery method in which the most efficient route (from a selected delivery agent's current location to the user's current location) can be selected. Furthermore, the arrangements described herein create cash efficiencies. For example, the cash collected by delivery agents during their regular business activities would be deposited with a provider institution anyway if the cash were not redirected to the user. Directing the cash from the delivery agent or cash storage device to the user eliminates the process of the delivery agent depositing the cash with the provider institution at a physical location of the provider institution. The location-based and availability-based mobile application described herein provides a channel by which such process is automated. Additionally, the arrangements described herein capitalize on availability of delivery agents because adding delivery agents to the cash distribution network allows for more coverage in areas with higher population densities, making it easier for a user to get the needed cash as quickly as possible.

Figure 2:
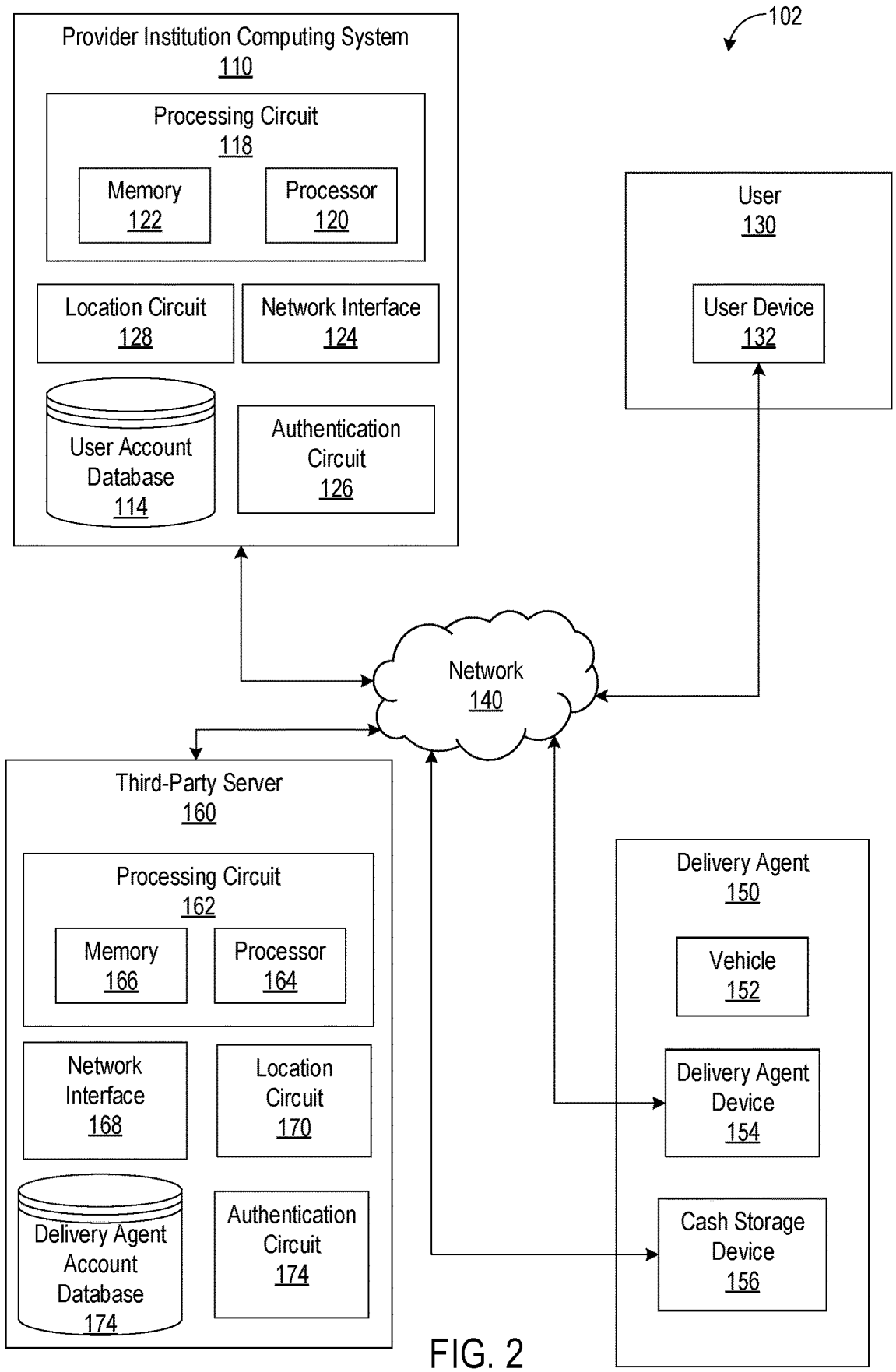
FIG. 2 is a block diagram of an example cash delivery and ride sharing system, according to some arrangements.

FIG. 1 is an illustration of a cash delivery method 100, according to some arrangements. FIG. 2 is a block diagram of an example cash delivery system 102, according to some arrangements. Referring to FIGS. 1-2, the method 100 involves a user 130, a delivery agent 150 in a delivery agent vehicle 152, and a cash storage device 156. The user 130 has a user device 132 from which the user 130 requests cash via a mobile application. For example, the user 130 may be attending an event where cash is needed, and the user 130 does not have any cash. The request from the user is accepted by the delivery agent 150 via a delivery agent device 154, and the delivery agent 150 is provided instructions regarding how to navigate to the user device 132. The delivery agent 150 proceeds to the user 130 where the user 130 withdraws cash from the cash storage device 156. In some embodiments, the user 130 provides a personal identification number (PIN) to the cash storage device 156 to withdraw the cash. In some embodiments, the user 130 provides another method of identity verification to the cash storage device 156 to verify the identity of the user 130 prior to the user 130 withdrawing cash.

The system 102 includes a provider institution computing system 110, the user 130, the delivery agent 150, the third-party server 160, and a network 140. The user 130 includes the user device 132. The delivery agent 150 includes the delivery agent vehicle 152, the delivery agent device 154, and the cash storage device 156. Each of the provider institution computing system 110, the user device 132, the delivery agent device 154, the cash storage device 156, and the third-party server 160 is a computing system having suitable processing, storage, and networking capabilities.

The user device 132 may be any kind of device or system the user 130 can carry and provide for communication between the user device 132 and other devices. For example, the user device 132 can be a cellular phone, a tablet computer, a laptop computer, a personal digital assistant, a smart phone, or any other device that provides for communication. The user device 132 is further described with reference to FIG. 3.

The delivery agent vehicle 152 may be any kind of vehicle suitable to transport at least one person that includes sufficient space for the cash storage device 156. In some embodiments, the delivery agent vehicle 152 is a passenger vehicle (e.g., a car, a truck, a bus, a ferry, a boat, a ship, etc.) and the delivery agent 150 may use the delivery agent vehicle 152 to transport passengers from one place to another. In some situations, the passengers can include the user 130. In some embodiments, the delivery agent vehicle 152 is a business vehicle (e.g., a food truck, etc.) and the delivery agent may use the delivery agent vehicle 152 to conduct business (e.g., selling food).

The delivery agent device 154 may be any kind of device or system the delivery agent 150 can carry and provide for communication between the delivery agent device 154 and other devices. For example, the delivery agent device 154 can be a cellular phone, a tablet computer, a laptop computer, a personal digital assistant, or any other device that provides for communication. The delivery agent device 154 is further described with reference to FIG. 4.

The cash storage device 156 can be any type of device or system configured to store cash for transactions or deposits. Examples of the cash storage device 156 include, but are not limited to, ATMs or other cash dispensing devices. The cash storage device 156 is further described with reference to FIG. 5.

The provider institution computing system 110 includes a user account database 114, a processing circuit 118, a network interface 124, an authentication circuit 126, and a location circuit 128. The provider institution computing system 110 can be a computing system used by any type of provider institution. Examples of provider institutions include, but are not limited to, banks, credit card providers, and other institutions that provide financial services to users.

The user account database 114 stores data related to each user that has an account with the provider institution. The user account database 114 includes personal data related to each user such as the user's name, address, contact information (including a mobile device number), and login information for accessing the user's information via a website or mobile application related to the provider institution. The user account database 114 also stores account information related to each user such as the user's account number (or numbers), the available balance in the user's account (or accounts), and any other information related to the user's account with the provider institution.

In some arrangements, the processing circuit 118 has a processor 120 and a memory 122. The processor 120 can be implemented as a general-purpose processor, an application specific integrated circuit (ASIC), field programmable gate arrays (FGPAs), a digital signal processor (DSP), a group of processing components, or other suitable electronic processing components. The memory 122 stores data and/or computer code for facilitating the various processes described herein. The memory 122 can be implemented as random access memory (RAM), read-only memory (ROM), non-volatile random access memory (NVRAM), Flash Memory, hard disk storage, and the like. Moreover, the memory 122 is or includes tangible, non-transient volatile memory or non-volatile memory. Accordingly, the memory 122 includes database components, object code components, script components, or any other type of information structure for supporting the various activities and information structures described herein.

The network interface 124 is configured for and structured to communicate data over the network 140. For example, the network interface 124 is configured for and structured to send and receive information related to a cash withdrawal transaction initiated by a user. Accordingly, the network interface 124 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The authentication circuit 126 is configured to generate authentication codes to be used during a cash withdrawal transaction. The authentication codes are sent from the provider institution computing system to the user device 132 such that the user device 132 can be authenticated during a transaction. The authentication codes can be any type of code that provide for a secure transaction. For example, the authentication codes can be generated as quick response (QR) codes, randomly generated alphanumeric codes, encrypted codes, etc. The authentication circuit 126 is also configured to receive signals sent from the user device 132 and the cash storage device 156 regarding the authenticity of a cash withdrawal transaction. In an example arrangement, the cash storage device 156 may scan a QR code on the user device 132 and provide the scanned image to the authentication circuit 126. The authentication circuit 126 compares the QR code sent to the user device 132 to the QR code received from the cash storage device 156 to determine whether the two QR codes are equal. If the two QR codes are equal, the authentication circuit 126 sends a message verifying the authenticity of the user device 132. In another example arrangement, the user 130 may provide a PIN to the cash storage device 156, and the cash storage device 156 may send the PIN to the authentication circuit 126 to verify that the PIN entered by the user 130 matches the PIN in the authentication circuit 126.

The location circuit 128 is configured to determine the location of the potential parties to a cash withdrawal transaction. The potential parties to a cash withdrawal transaction include the user 130 and all potential delivery agents that are near the user 130 (e.g., within a predetermined distance such as, but not limited to, five miles of the user 130). In some arrangements, the location circuit 128 receives global positioning system ("GPS") coordinates of each of the potential parties to a transaction. The location circuit 128 can determine, based on the relative locations of each of the parties and the parties willing to engage in the transaction, the optimal delivery path. For example, after the user 130 requests cash the location circuit 128 determines which of the delivery agents in the delivery agent account database 172 are near the user device 132 based on the GPS coordinates of the devices associated with the delivery agents and the GPS coordinates of the user device 132. The location circuit 128 routes the delivery agent 150 to the user 130 to provide for the fastest and most efficient cash delivery.

The third-party server 160 includes a processing circuit 162, a network interface 168, a location circuit 170, a delivery agent account database 172, and an authentication circuit 174. The third-party server 160 can be a computing system used by any type of third party. Examples of third parties include, but are not limited to, ride sharing entities, food truck and/or food delivery entities, and any other type of entity that provides a service to a customer where the service requires bringing a vehicle to a customer.

In some arrangements, the processing circuit 162 has a processor 164 and a memory 166. The processor 164 can be implemented as a general-purpose processor, an ASIC, FGPAs, a DSP, a group of processing components, or other suitable electronic processing components. The memory 166 stores data and/or computer code for facilitating the various processes described herein. The memory 166 can be implemented as RAM, ROM, NVRAM, Flash Memory, hard disk storage, and the like. Moreover, the memory 166 is or includes tangible, non-transient volatile memory or non-volatile memory. Accordingly, the memory 166 includes database components, object code components, script components, or any other type of information structure for supporting the various activities and information structures described herein.

The network interface 168 is configured for and structured to communicate data over the network 140. For example, the network interface 168 is configured for and structured to send and receive information related to a cash withdrawal transaction initiated by a user. Accordingly, the network interface 168 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The location circuit 170 is configured to determine the location of devices connected to the third-party server 160 via the network 140 (e.g., the devices of potential delivery agents near the user 130). In some arrangements, the location circuit 170 receives GPS coordinates of each of the devices of the potential delivery agents. In some embodiments, the location circuit 170 provides the GPS coordinates of the devices of the potential delivery agents to the location circuit 128 via the network 140.

The delivery agent account database 172 stores data related to a plurality of delivery agents (including the delivery agent 150). As referred to herein, a delivery agent is an individual that is authorized to maintain a cash storage device (e.g., the cash storage device 156) on behalf of the provider institution computing system 110. In some embodiments, a delivery agent can be an individual that transports others in a vehicle, where the delivery agent and those transported by the delivery agent are connected via a mobile application. In some arrangements, the delivery agent can be an individual that operates a mobile business where the business comes to the customer (e.g., a food truck, mobile dog grooming, etc.). Each delivery agent must be authorized by the third-party server 160 prior to data related the delivery agent being included in the delivery agent database 172. The authorization process may include background checks, credit checks, and/or an application each delivery agent must fill out. Upon approval, information related to a delivery agent (e.g., the delivery agent 150) is uploaded to the delivery agent database. Information included in the delivery agent database includes, but is not limited to, a name, address, contact information (including a mobile device number), vehicle information, photograph(s), and payment information related to each delivery agent.

Figure 3:
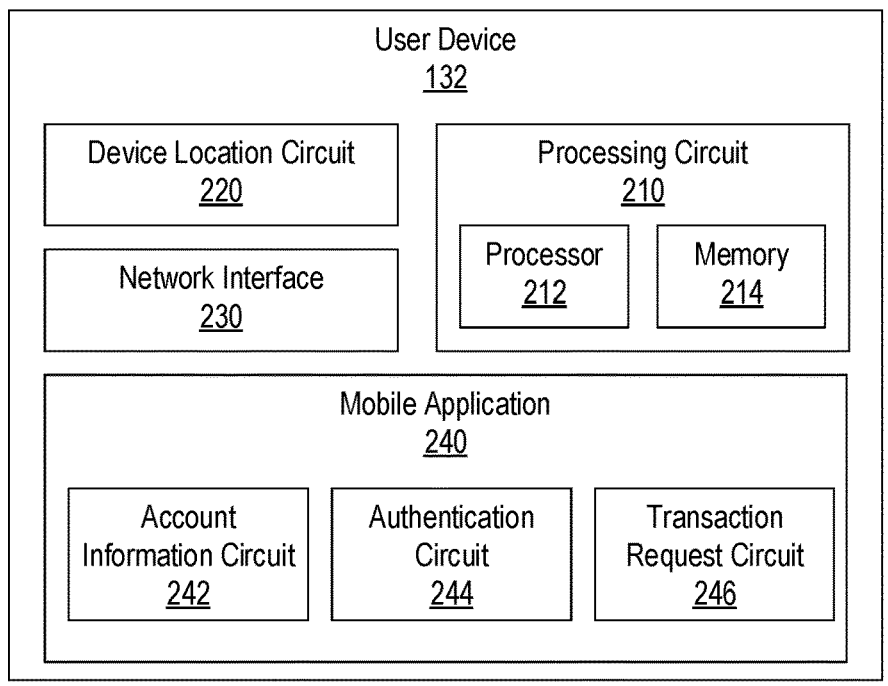
FIG. 3 is a block diagram of an example of a user device, according to some arrangements.

FIG. 3 is a block diagram of an example of the user device 132, according to some arrangements. The user device 132 includes a processing circuit 210, a device location circuit 220, a network interface 230, and a mobile application 240.

In some arrangements, the processing circuit 210 has a processor 212 and a memory 214. The processor 212 can be implemented as a general-purpose processor, an ASIC, FGPAs, a DSP, a group of processing components, or other suitable electronic processing components. The memory 214 stores data and/or computer code for facilitating the various processes described herein. The memory 214 can be implemented as RAM, ROM, NVRAM, Flash Memory, hard disk storage, and the like. Moreover, the memory 214 is or includes tangible, non-transient volatile memory or non-volatile memory. Accordingly, the memory 214 includes database components, object code components, script components, or any other type of information structure for supporting the various activities and information structures described herein.

The device location circuit 220 is configured to determine the location of the user device 132 and provide the location of the user device 132 to other entities (e.g., the location circuit 128) via the network interface 230. The device location circuit 220 determines the location of the user device 132 based on the GPS coordinates of the user device 132. In some arrangements, the device location circuit 220 is a GPS receiver. In some arrangements, the device location circuit 220 is in communication with a GPS receiver of the user device 132. The device location circuit 220 can determine the GPS location of the user device 132 based on GPS signals received from GPS satellites.

The network interface 230 is configured for and structured to communicate data over the network 140. For example, the network interface 230 is configured for and structured to send and receive information related to a cash withdrawal transaction initiated by a user. Accordingly, the network interface 230 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The mobile application 240 is software configured to run on a mobile device or other computing device (e.g., the user device 132, the delivery agent device 154, etc.). In some embodiments, the mobile application 240 is related to ride sharing, where the user 130 can request a ride from one location to another. In embodiments where the mobile application 240 is a ride sharing application, the mobile application 240 may also provide the user 130 with the option of withdrawing cash when requesting a ride, or in lieu of requesting a ride the user 130 can request a cash delivery. In some arrangements, the mobile application is related to food service (e.g., a food truck, a food delivery service, etc.). In arrangements where the mobile application 240 is related to food service, the mobile application 240 may also provide the user 130 with the option of withdrawing cash when requesting the food service, or in lieu of requesting food service the user 130 can just request a cash delivery. In some embodiments, the mobile application 240 is related to some other service where the service goes to the user via a vehicle (e.g., mobile dog grooming, mobile haircuts, etc.). In embodiments where the mobile application 240 is related to some other service, the mobile application 240 may also provide the user 130 with the option of withdrawing cash when requesting the other service, or in lieu of requesting the other service the user 130 can just request a cash delivery. Regardless of the service with which the mobile application 240 is associated, the mobile application 240 is configured to initiate a cash withdrawal transaction and provide information regarding the transaction to the parties involved in the transaction. The mobile application 240 includes an account information circuit 242, an authentication circuit 244, and a transaction request circuit 246.

The account information circuit 242 is configured to access information regarding the account of the user 130 with the provider institution computing system 110. For example, the account information circuit 242 communicates with the user account database 114 to provide the user 130 with current information regarding the account of the user 130 (e.g., how much cash is available to be withdrawn).

The authentication circuit 244 is configured to receive an authentication code from the provider institution computing system 110 and provide the authentication code for verification of a cash withdrawal transaction. In arrangements where the authentication code is encrypted, the authentication circuit 244 is configured to decrypt the authentication code when providing the authentication code for verification purposes.

The transaction request circuit 246 is configured to process a cash withdrawal request from the user 130 and send the cash withdrawal request from the user device 132 to the provider institution computing system 110. The transaction request circuit 246 provides information including the amount of cash desired, the account(s) from which the cash is desired, and the currency in which the cash is desired.

Figure 4:
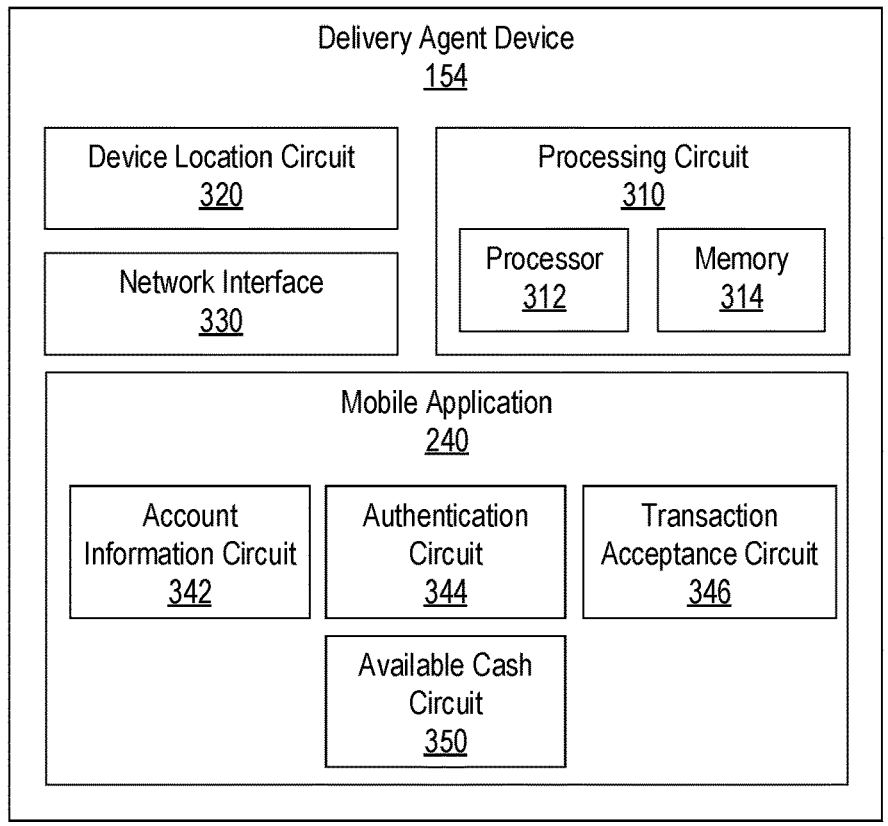
FIG. 4 is a block diagram of an example of a delivery agent device, according to some arrangements.

FIG. 4 is a block diagram of an example of the delivery agent device 154, according to some arrangements. The delivery agent device 154 includes a processing circuit 310, a device location circuit 320, a network interface 330, and the mobile application 240.

In some arrangements, the processing circuit 310 has a processor 312 and a memory 314. The processor 312 can be implemented as a general-purpose processor, an ASIC, FGPAs, a DSP, a group of processing components, or other suitable electronic processing components. The memory 314 stores data and/or computer code for facilitating the various processes described herein. The memory 314 can be implemented as RAM, ROM, NVRAM, Flash Memory, hard disk storage, and the like. Moreover, the memory 314 is or includes tangible, non-transient volatile memory or non-volatile memory. Accordingly, the memory 314 includes database components, object code components, script components, or any other type of information structure for supporting the various activities and information structures described herein.

The device location circuit 320 is configured to determine the location of the delivery agent device 154 and provide the location of the delivery agent device 154 to other entities (e.g., the location circuit 128 and/or the location circuit 170) via the network interface 330. The device location circuit 320 determines the location of the delivery agent device 154 based on the GPS coordinates of the delivery agent device 154. In some arrangements, the device location circuit 320 is a GPS receiver. In some arrangements, the device location circuit 320 is in communication with a GPS receiver of the delivery agent device 154. The device location circuit 320 can determine the GPS location of the delivery agent device 154 based on GPS signals received from GPS satellites.

The network interface 330 is configured for and structured to communicate data over the network 140. For example, the network interface 330 is configured for and structured to send and receive information related to a cash withdrawal transaction initiated by a user. Accordingly, the network interface 330 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The mobile application 240 further includes an account information circuit 342, an authentication circuit 344, a transaction acceptance circuit 346, and an available cash circuit 350. The account information circuit 342 is configured to access information regarding the account of the delivery agent 150 with the third-party server 160. For example, the account information circuit 342 communicates with the delivery agent database 112 to provide the delivery agent 150 with current information regarding the account of the delivery agent 150 (e.g., how many deliveries the delivery agent 150 has successfully completed, how other users have ranked the service of the delivery agent 150, etc.).

The authentication circuit 344 is configured to receive an authentication code from the third party sever 160 and/or the provider institution computing system 110 and provide the authentication code to deposit cash into the cash storage device 156. In arrangements where the authentication code is encrypted, the authentication circuit 344 is configured to decrypt the authentication code when providing the authentication code for verification purposes.

The transaction acceptance circuit 346 is configured to process a cash withdrawal acceptance from the delivery agent 150 and send the acceptance from the delivery agent device 154 to the provider institution computing system 110 and/or the third-party server 160.

The available cash circuit 350 is configured to determine data related to the amount of cash the delivery agent 150 has on hand that is available to deposit into the cash storage device 156 for a future cash withdrawal by the user 130. The data is communicated to the provider institution computing system 110 and/or the third-party server 160. The data determined by the available cash circuit 450 includes, but is not limited to, the total value of cash the delivery agent 150 has on hand, the denominations of cash the delivery agent has 150 on hand, the number of bills of each denomination of cash the delivery agent 150 has on hand, and the type of currency (e.g., US dollars, Euros, etc.) the delivery agent 150 has on hand. The available cash circuit 350 can make these determinations based on information provided to the mobile application 240 related to the services provided by delivery agent 150.

In one arrangement, the mobile application 240 may track each transaction completed by the delivery agent 150, including the transaction cost and how payment was received. For example, the delivery agent 150 may pick up a customer at a first location and drive the customer to a second location. The customer is charged an amount (as an exemplary amount, $15) for the service provided by the delivery agent 150. If the customer pays the delivery agent 150 in cash, the delivery agent 150 enters the amount of cash paid into the mobile application 240 via a suitable interface provided by the mobile application 240, and the information is provided to the available cash circuit 350. For example, the delivery agent 150 may enter the total amount paid, the type of currency used (e.g., US dollars, Euros, etc.), and the denominations of bills used. In some arrangements, the delivery agent device 154 may include a camera in communication with the available cash circuit 350. In such arrangements, the delivery agent 150 can take pictures of the cash paid by the customer, and the available cash circuit 350 can determine the total amount paid, the type of currency used, and the denominations of bills used by using an image recognition software. In some arrangements, an available cash indicator can be sent to the provider institution computing system 110 in response to each transaction being completed. In some arrangements, available cash indicators (determined in response to each transaction being completed) can be sent to the provider institution computing system 110 periodically (e.g., in batches), at regular intervals (e.g., every ten minutes, every half hour, every hour, etc.) throughout each day. By enabling the available cash circuit 350 to provide real-time or near-real-time updates regarding the amount of cash that any delivery agent has on hand, the provider institution computing system 110 can leverage the up-to-date information to select an appropriate delivery agent for the cash delivery in the manner described.

Figure 5:
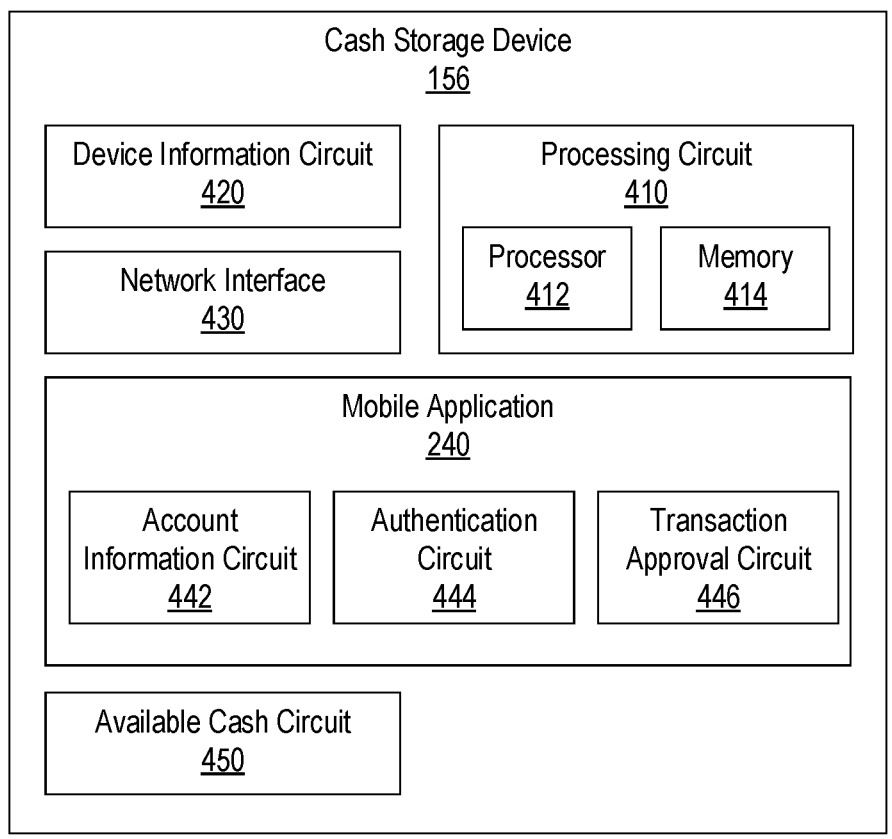
FIG. 5 is a block diagram of an example cash storage device, according to some arrangements.

FIG. 5 is a block diagram of the cash storage device 156, according to some arrangements. The cash storage device 156 includes a processing circuit 410, a device information circuit 420, a network interface 430, the mobile application 240, and an available cash circuit 450.

In some arrangements, the processing circuit 410 has a processor 412 and a memory 414. The processor 412 can be implemented as a general-purpose processor, an ASIC, FGPAs, a DSP, a group of processing components, or other suitable electronic processing components. The memory 414 stores data and/or computer code for facilitating the various processes described herein. The memory 414 can be implemented as RAM, ROM, NVRAM, Flash Memory, hard disk storage, and the like. Moreover, the memory 414 is or includes tangible, non-transient volatile memory or non-volatile memory. Accordingly, the memory 414 includes database components, object code components, script components, or any other type of information structure for supporting the various activities and information structures described herein.

The device information circuit 420 is configured to provide information related to the cash storage device 156 to the provider institution computing system 110. Examples of information provided to the provider institution computing system 110 include, but are not limited to, the location of the cash storage device 156, whether the cash storage device 156 is in operation, and whether the delivery agent 150 is open for business at the time the cash delivery is requested. In some arrangements, the cash storage device 156 may include a GPS receiver that provides an exact GPS location of the cash storage device 156. In some arrangements, the GPS location of the delivery agent device 154 or the delivery agent vehicle 152 may be used as a proxy for the location of the cash storage device 156. In arrangements where the cash storage device 156 is not in operation (e.g., the cash storage device 156 is malfunctioning, broken, or otherwise not operating properly), the device information circuit 420 provides information regarding the operational status of the cash storage device 156 to the provider institution computing system 110. In arrangements where the delivery agent 150 is not working, the device information circuit 420 notifies the provider institution computing system 110 that the cash storage device 156 is unavailable to dispense cash. In arrangements where the cash storage device 156 is operational and the delivery agent 150 is working, the device information circuit 420 notifies the provider institution computing system 110 that the cash storage device 156 is available to dispense cash.

The network interface 430 is configured for and structured to communicate data over the network 140. For example, the network interface 430 is configured for and structured to send and receive information related to a cash withdrawal transaction initiated by a user. Accordingly, the network interface 430 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The mobile application 240 further includes an account information circuit 442, an authentication circuit 444, and a transaction approval circuit 446. The account information circuit 442 is configured to access information regarding the account of the third-party server 160 with the provider institution computing system. For example, the account information circuit 442 communicates with the third party account database 116 to provide the third-party server 160 with current information regarding the account of the third-party server 160 (e.g., the balance of the account from which cash will be withdrawn).

In some arrangements, the authentication circuit 444 is configured to receive an authentication code from the delivery agent device 154 and provide the authentication code to the authentication circuit 126 for verification of the delivery agent device 154 for a cash deposit transaction. In some arrangements, the authentication circuit 444 receives the same authentication code as the delivery agent device 154 and verifies the delivery agent device 154 without providing the authentication code to the authentication circuit 126. In such arrangements, the authentication circuit 444 compares the authentication code provided by the delivery agent device 154 to the authentication code provided by the provider institution computing system 110. If the authentication codes match, the delivery agent device 154 is verified and the delivery agent 150 is permitted to add cash to the cash storage device 156. In arrangements where the authentication code is encrypted, the authentication circuit 444 is configured to decrypt the authentication code provided by the delivery agent device 154 in order to verify the delivery agent device 154.

In some arrangements, the authentication circuit 444 is configured to receive an authentication code from the user device 132 and provide the authentication code to the authentication circuit 126 for verification of the user device 132 for a cash withdrawal transaction. In some arrangements, the authentication circuit 444 receives the same authentication code as the user device 132 and verifies the user device 132 without providing the authentication code to the authentication circuit 126. In such arrangements, the authentication circuit 444 compares the authentication code provided by the user device 132 to the authentication code provided by the provider institution computing system 110. If the authentication codes match, the user device 132 is verified and the user 130 is permitted to withdraw the cash. In arrangements where the authentication code is encrypted, the authentication circuit 444 is configured to decrypt the authentication code provided by the delivery agent device 154 in order to verify the delivery agent device 154.

The transaction acceptance circuit 446 is configured to process a cash withdrawal acceptance from the delivery agent 150 and send the acceptance from the delivery agent device 154 to the provider institution computing system 110.

The available cash circuit 450 is configured to determine data related to the amount of cash available for withdrawal and communicate the data to the provider institution computing system 110. The data determined by the available cash circuit 450 includes, but is not limited to, the total value of cash on hand in the cash storage device 156, the denominations of cash on hand in the cash storage device 156, the number of bills of each denomination of cash available in the cash storage device 156, and the type of currency (e.g., US dollars, Euros, etc.) available in the cash storage device 156. The cash storage device 156 can make these determinations in various ways.

In one arrangement, the cash storage device 156 includes various sensors coupled to the available cash circuit 450 to determine the data related to the cash available in the cash storage device 156. The cash storage device 156 may include optical sensors configured to determine the type of currency based on images of the available currency. The optical sensors may also be configured to determine how many bills of each denomination are available based on a height of a stack of bills. The cash storage device 156 may also be equipped with weight sensors that can detect the weight of cash to determine how many bills are available in a stack of bills. For example, in arrangements where the cash storage device 156 is an ATM, each cash receiving slot may be equipped with an optical sensor and or a weight sensor such that the available cash circuit 450 can determine the type of currency available in each cash receiving slot, the denomination of the currency available, and how many bills of each denomination are available. In one arrangement, the available cash circuit 450 includes a bill counter that can count the amount of cash stored in the cash storage device 156.

Prior to the available cash circuit 450 sending a cash level indicator to the provider institution computing system 110, the sensor or the bill counter determines the amount of cash stored in the cash storage device 156 by counting the bills. In response to the sensor or the bill counter determining the amount of cash stored in the cash storage, the available cash circuit 450 automatically (without any human input) sends a cash level indicator corresponding to the amount of stored cash to the provider institution computing system 110. In that regard, the sensor or the bill counter can also determine the amount of cash periodically, at regular intervals (e.g., every ten minutes, every half hour, every hour, etc.) throughout each day.

Figure 6:
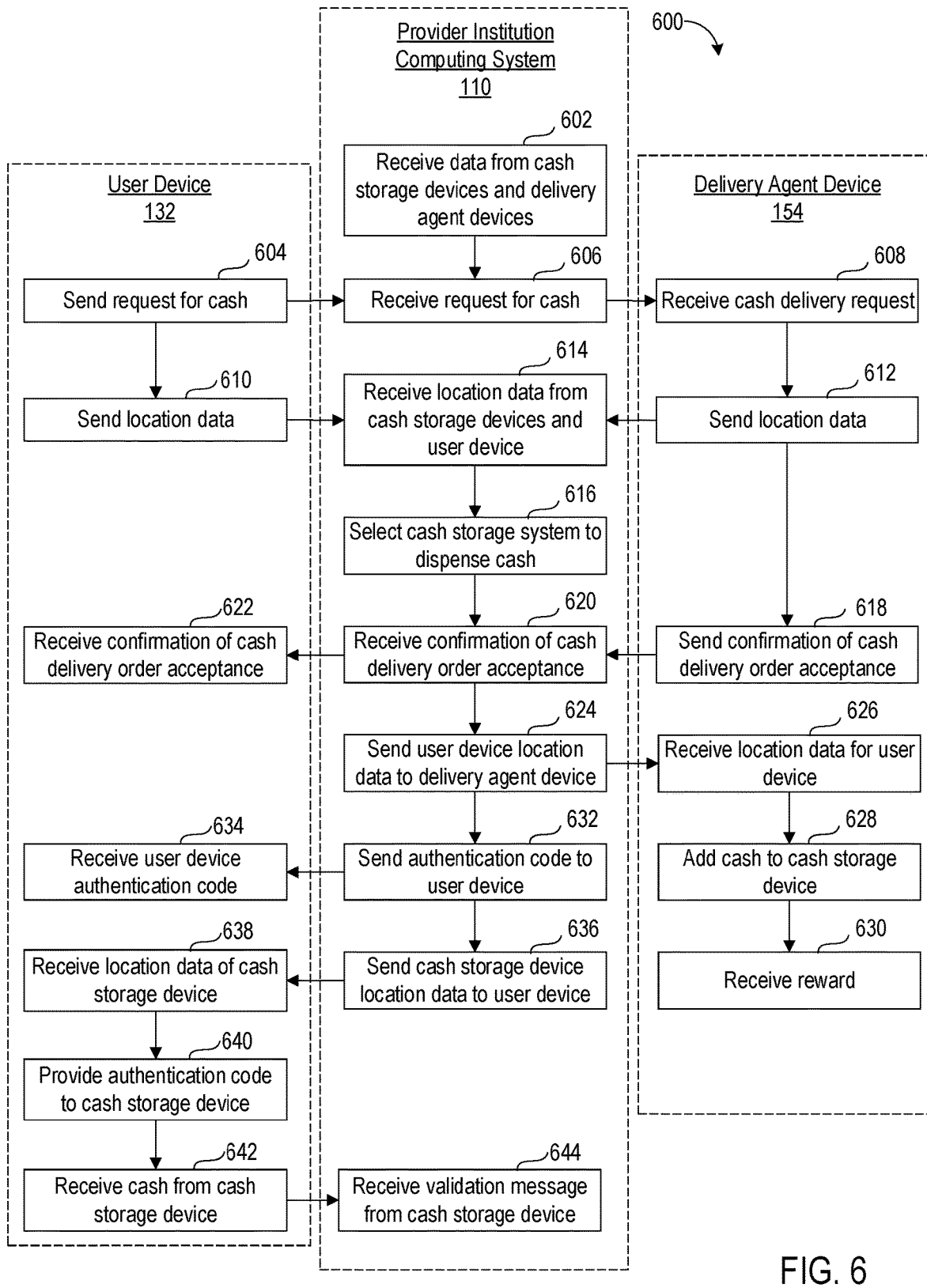
FIG. 6 is a flow diagram illustrating a method for processing a cash delivery request, according to various arrangements.
Figure 7:
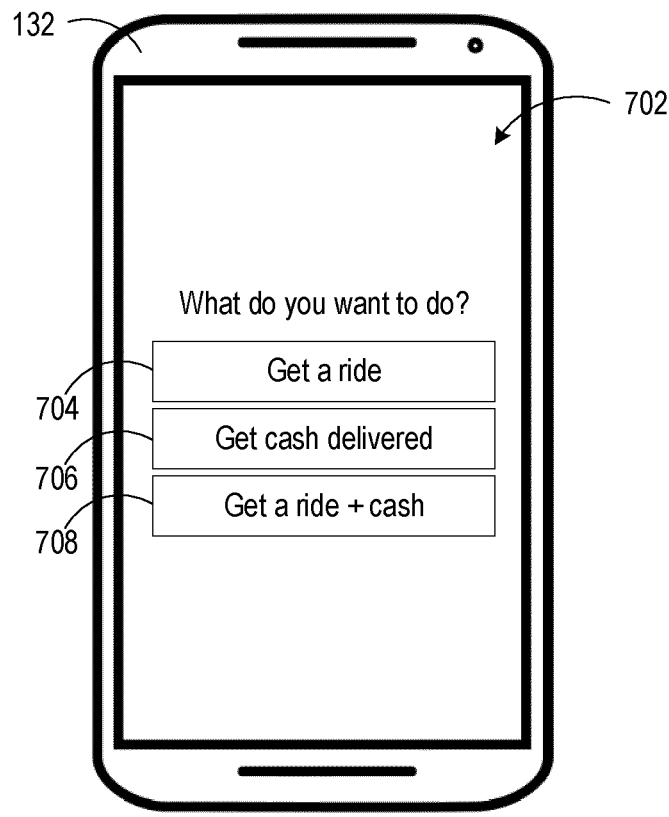
FIGS. 7-12 are illustrations of mobile application displays or interfaces used to deliver cash to a user.
Figure 8:
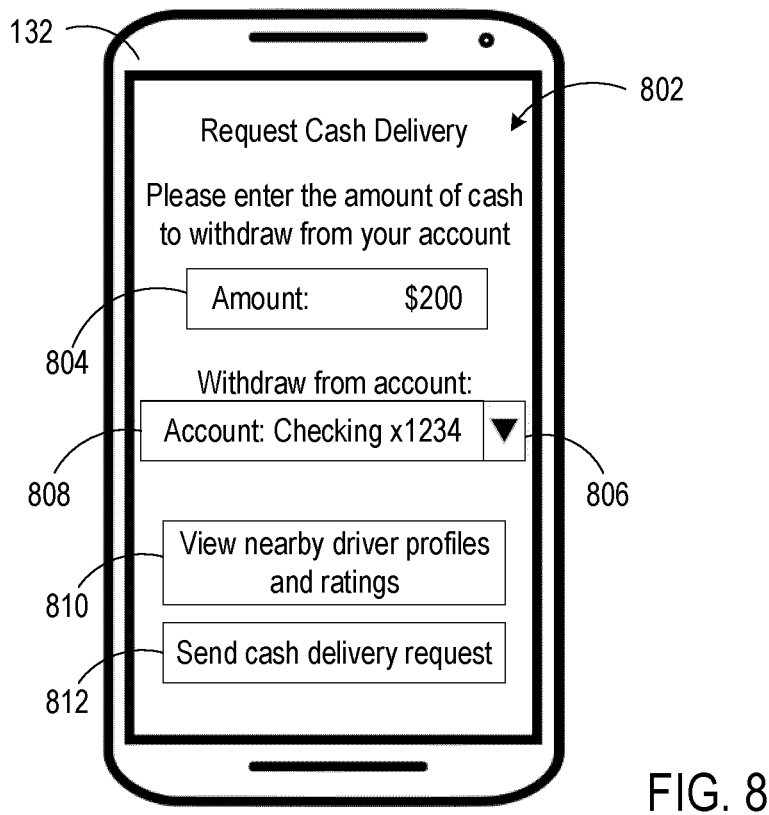
Figure 9:
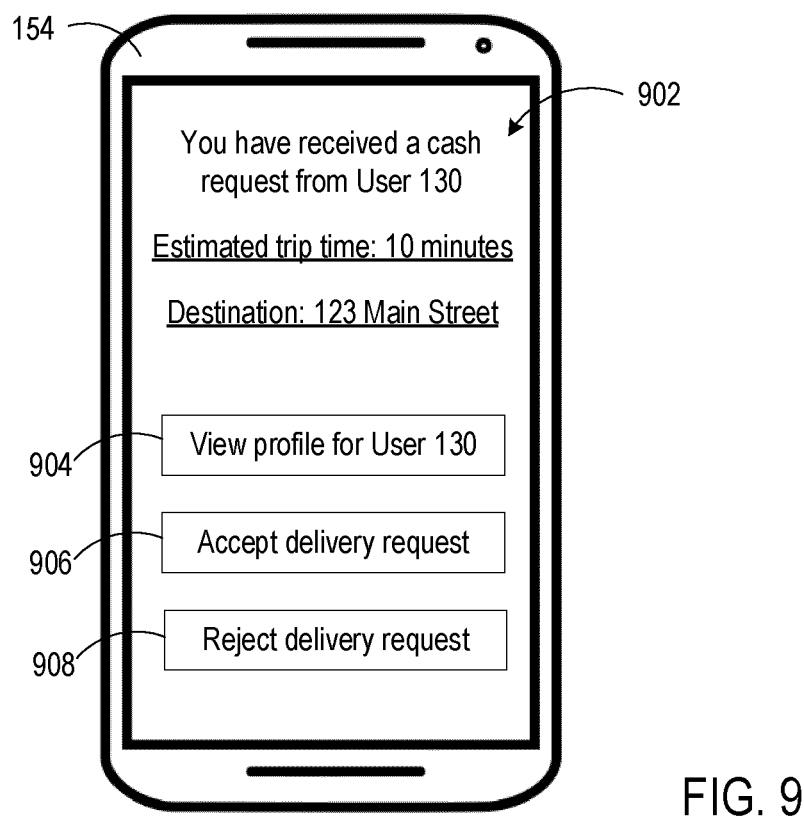
Figure 10:
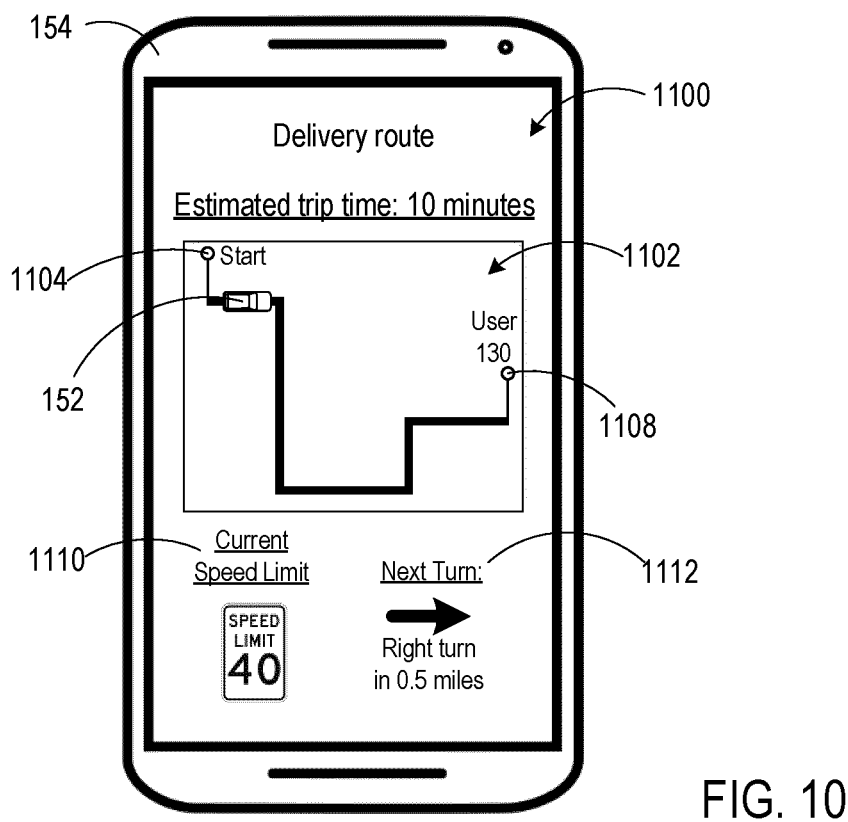
Figure 11:
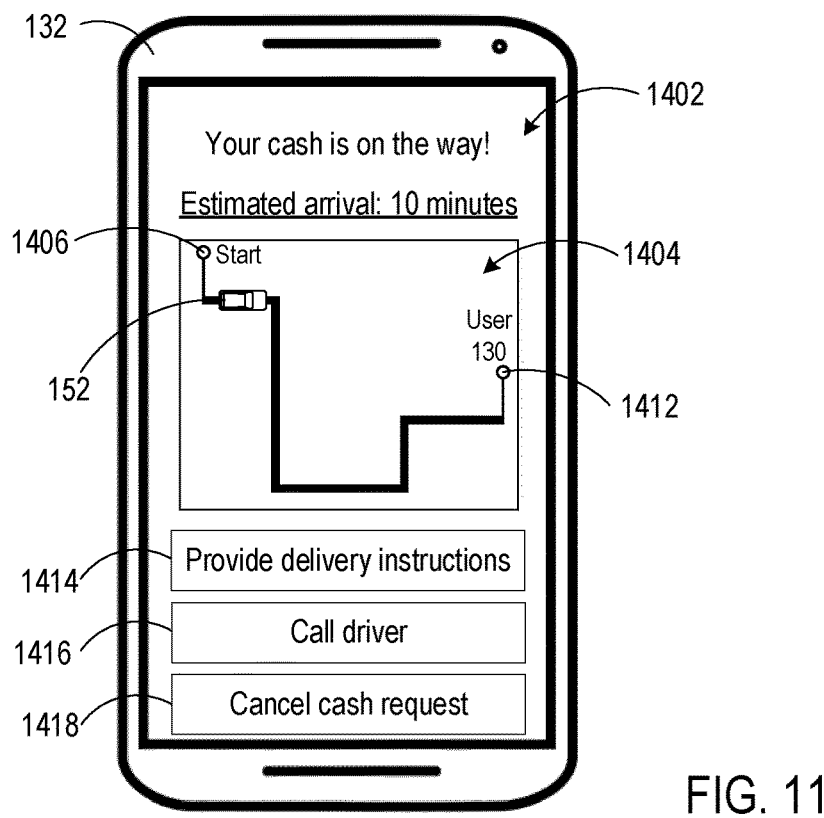
Figure 12:
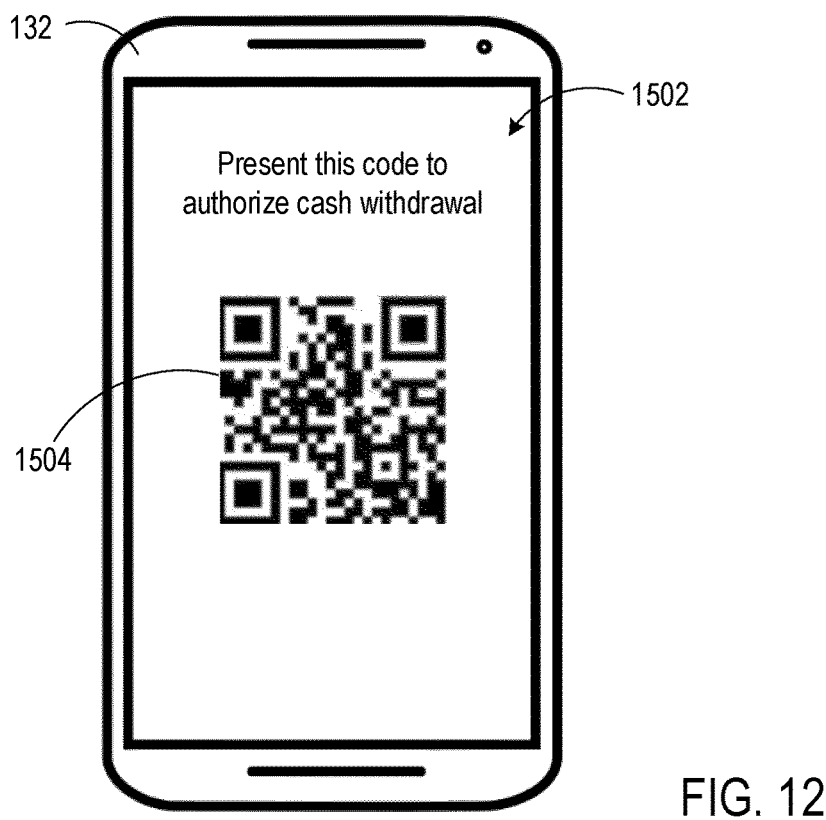

FIG. 6 is a flow diagram illustrating a method 600 for processing a cash delivery request, according to various arrangements. Referring to FIGS. 1-6, the method 600 can be executed by the user device 132, the delivery agent device 154, the provider institution computing system 110, and the third-party server 160, in some embodiments.

At 602, data is received from a plurality of cash storage devices and a plurality of delivery agent devices. In some arrangements, the provider institution computing system 110 receives data from the available cash circuit 450 and the available cash circuit 350 regarding the amount of cash available for withdrawal from the plurality of cash storage devices and the amount of cash each of the plurality of delivery agents has available on hand to deposit in to the plurality of cash storage devices. In some arrangements, the provider institution computing system 110 receives cash data from the available cash circuit 450 and the third-party server 160, where the provider institution computing system 110 receives data related to the plurality of cash storage devices and the third-party server 160 receives cash data related to the plurality of delivery agents. The cash data can include information related to the amount of cash available, the type of currency available, the number of bills of each denomination of currency available, and whether the plurality of cash storage devices are operational. Additional data received can include whether the plurality of delivery agents are open for business. In some arrangements, the data is sent continuously. In some arrangements, the data is sent at regular intervals (e.g., every 10 seconds, every two minutes, every ten minutes, etc.).

At 604, a request for cash is sent. In some arrangements, the user 130 may be at a location where the user 130 needs cash but cannot access the needed cash. The user 130 sends a request for cash via the user device 132 to the provider institution computing system 110. The request for cash may include information regarding the request such as the amount of cash desired, the type of currency desired, the denominations of cash desired, the location to which the user wants the cash delivered, etc.

At 606, the request for cash is received. In some arrangements, the provider institution computing system 110 receives the request from the user device 132. The provider institution computing system 110 can then verify that the user 130 has enough funds in an account by referencing the user account database 114 and confirming that the user account associated with the device from which the request was sent (e.g., the user device 132) includes sufficient funds for the withdrawal. Upon verifying that the account of the user 130 has sufficient funds for the cash withdrawal, the provider institution computing system 110 send the request for cash to a plurality of potential delivery agents (including the delivery agent 150).

At 608 the request for cash delivery is received. In some arrangements, the plurality of potential delivery agents are notified of the request for cash delivery by a message on a delivery agent device for each of the plurality of potential delivery agents. For example, the delivery agent 150 receives the request for cash via a notification on the delivery agent device 154. In some arrangements, the request for cash includes the amount of cash desired and the location to which the user 130 wants the cash delivered. In some arrangements, the request for cash is only delivered to a subset of the plurality of delivery agents that have the amount of cash requested available to provide to the user 130. For example, if the user 130 desires to withdraw $200, the request for cash will only be sent to the subset of the plurality of delivery agents that have $200 in cash available. In some arrangements, the location is provided as an approximate location entered by the user 130 when sending the request. In some arrangements, the location is provided as a GPS location of the user device 132.

At 610, location data is sent from the user device 132. The user device 132 sends location data related to the user device 132 to the provider institution computing system 110. In some arrangements, the location data includes the GPS coordinates of the user device 132. In some arrangements, the location data includes an approximate location of the user device 132 as an address at which the user 130 would like the cash delivered. In some arrangements, the location data is provided continuously (e.g., every second, every five seconds, every ten seconds, etc.) such that the location data provided is accurate even if the user 130 is moving.

At 612, location data is sent from the plurality of delivery agent devices (including the delivery agent device 154). The plurality of delivery agent devices send location data related to the delivery agent devices to the provider institution computing system 110 and/or the third-party server 160. In some arrangements, the location data includes the GPS coordinates of the delivery agent devices. In some arrangements, the location data is provided continuously (e.g., every second, every five seconds, every ten seconds, etc.) such that the location data provided is accurate even if the delivery agent 150 is moving.

At 614, the provider institution computing system 110 receives the location data from the user device 132 and the delivery agent devices. In some arrangements, the provider institution computing system 110 receives the location data of the delivery agent device 154 via the third-party server 160. In some arrangements, the provider institution computing system 110 receives the location data continuously such that the provider institution computing system 110 can provide accurate cash delivery recommendations. In some arrangements, the provider institution computing system 110 receives the location data for the user device 132 and the delivery agent devices prior to sending the case delivery request. In such arrangements, the provider institution computing system 110 determines which of the plurality of delivery agents to notify of the cash delivery request based on the proximity of the plurality of potential delivery agent devices to the user device 132. For example, the provider institution computing system 110 may only send notification of the cash delivery request to the subset of the plurality of potential delivery agents that are within a five mile radius of the user device 132.

At 616, a cash storage device is chosen to dispense the cash. In some arrangements, the provider institution computing system 110 selects the cash storage device (e.g., the cash storage device 156) based on the data received at 602 and the locations of the user device 132 and the delivery agent device 154. In some arrangements, the provider institution computing system 110 can determine which potential cash storage devices to eliminate based on proximity to the user 130 and the delivery agent 150. For example, the user 130 and the delivery agent 150 may be in Chicago, so the provider institution computing system 110 can eliminate every potential cash storage device that is not located in Chicago. Additionally, in some arrangements the provider institution computing system 110 can determine which potential cash storage devices would provide for the most efficient cash delivery route. For example, the provider institution computing system 110 may identify a plurality of potential cash storage devices located within a predetermined radius (e.g., approximately two miles) of the user 130. In some arrangements, the provider institution computing system 110 determines which of the plurality of potential cash storage devices are available (e.g., the delivery agents associated with the potential cash storage devices are open for business). For example, the provider institution computing system 110 may eliminate potential cash storage devices located in delivery agent vehicles that are not operational.

At 618, confirmation of cash delivery order acceptance is sent. In some arrangements, if the delivery agent 150 desires to deliver the cash to the user 130, the delivery agent 150 provides acceptance via the delivery agent device 154, and the delivery agent device 154 sends the acceptance to the provider institution computing system 110. In some arrangements, more than one of the plurality of delivery agents may send acceptance to the provider institution computing system 110. In such arrangements, the provider institution computing system 100 may determine which delivery agent will deliver the cash, or the provider institution computing system 100 may allow the user 130 to determine which delivery agent will deliver the cash.

At 620, the cash delivery order acceptance confirmation is received. In some arrangements, the provider institution computing system 110 receives one acceptance from the delivery agent device 154. In some arrangements, the provider institution computing system 110 receives multiple acceptances from the devices associated with the plurality of potential delivery agents. In such arrangements, the provider institution computing system 110 can determine which of the plurality of potential delivery agents to choose (e.g., the delivery agent 150). The provider institution computing system 110 can also provide the user 130 with information associated with the plurality of potential delivery agents such that the user 130 can choose the delivery agent to deliver the cash (e.g., the delivery agent 150).

At 622, the user device 132 receives confirmation of the cash delivery order acceptance. In some arrangements, the user device 132 receives confirmation that the delivery agent 150 accepted the cash delivery request and will be delivering the cash. In some arrangements, the user device 132 receives confirmation that a plurality of delivery agents accepted the cash delivery request, and the user 130 must choose which of the plurality of delivery agents will deliver the cash. In such arrangements, the provider institution computing system 110 provides the user device 132 with information associated with each of the plurality of potential delivery agents. The information can include how long each of the plurality of potential delivery agents has been delivering cash, an approximate time until the cash is delivered from each of the plurality of potential delivery agents, the approximate location of each of the plurality of potential delivery agents relative to the location of the user 130, ratings associated with each of the plurality of potential delivery agents that have been submitted by other users, etc. After viewing the information, the user 130 can choose which of the plurality of potential delivery agents to deliver the cash, and the user device 132 sends confirmation of the choice to the provider institution computing system 110. The provider institution computing system 110 notifies each of the plurality of potential delivery agents of the decision by the user 130. In arrangements where one of the plurality of potential delivery agents is not chosen, a notification is sent that the user chose a different delivery agent. In arrangements where the delivery agent is chosen (e.g., the delivery agent 150), the delivery agent device 154 receives a notification that the acceptance of the delivery agent 150 was accepted by the user 130.

At 624, the location data of the user device 132 is provided to the delivery agent 150 via the delivery agent device 154. In some arrangements, the delivery agent device 154 receives location data from the provider institution computing system 110 regarding the locations of the user (e.g., the user device 132). In some arrangements, the provider institution computing system 110 provides directions on the delivery agent device 154 to direct the delivery agent 150 to the user device 132.

At 626, the location data for the user device 132 and the customer payment system are received by the delivery agent device 154. In some arrangements, the delivery agent device 154 provides a graphical view of the locations of the delivery agent device 154 and the user device 132, along with directions from the delivery agent device 154 to the user device 132.

At 628, cash is added to the cash storage device 156. In some arrangements, upon receiving the request for cash, the provider institution computing system 110 determines whether the amount of cash desired by the user 130 is available in the cash storage device 156, or if additional cash must be added to the cash storage device 156 by the delivery agent 150. In arrangements where cash must be added to the cash storage device 156, the delivery agent device 154 will receive a message from either the provider institution computing system 110 or the third-party server 160 to request the delivery agent 150 to add cash to the cash storage device 156. The delivery agent 150 can add cash by providing the cash storage device 156 with an authentication code to verify the identity of the delivery agent 150. The authentication code can be a PIN, a bar code, a QR code, or a biometric code (e.g., a fingerprint scan, retina scan, etc.). After verifying the identity of the delivery agent 150 with one of the cash storage device 156, the authentication circuit 126, or the authentication circuit 174, the cash storage device 156 accepts the cash and provides data to the provider institution computing system 110 regarding the amount of cash available to be dispensed. For instance, in response to verifying the identity of the delivery agent 150, the cash storage device 156 unlocks to grant access to a secure compartment, and the delivery agent 150 can place the cash into the compartment of the cash storage device 156.

At 630, the delivery agent 150 receives a reward. In some arrangements, the delivery agent 150 is provided with incentives to add cash to the cash storage device 156. The incentives can include cash awards and/or reward points that can be redeemed for a reward chosen by the delivery agent 150. In arrangements where the delivery agent 150 is provided with cash awards, the delivery agent 150 may receive a percentage of the cash added to the cash storage device as a reward. For example, the delivery agent 150 may receive a five percent reward for cash added, meaning that if the delivery agent 150 adds $100 to the cash storage device 156, the delivery agent 150 will receive $105 (e.g., the amount added plus five percent). The amount can be deposited directly into the bank account of the delivery agent 150 by the financial institution computing system 110 or the third-party server 160. In arrangements where the delivery agent 150 is provided with reward points, the reward points can be stored in an account associated with the delivery agent 150 on the third-party server 160, and the delivery agent 150 can redeem the points for rewards when desired.

At 632, an authentication code is sent to the user device 132. In some arrangements, the provider institution computing system 110 provides a code to the user device 132 in order to verify the identity of the user 130 during the cash withdrawal transaction. The code may be in the form of bar codes, QR codes, numeric codes, alphanumeric codes, etc. The user 130 can use the code at the cash storage device 156 to verify the identity of the user. In some arrangements, the authentication code is the PIN of the user 130 that the user typically uses when withdrawing cash from a conventional ATM. At 634, the user device 132 receives the user authentication code from the provider institution computing system 110.

At 636, the location data of the delivery agent device 154 and/or the cash storage device 156 is sent to the user device 132. In some arrangements, the provider institution computing system 110 sends the GPS location of the delivery agent device 154 and/or the cash storage device 156 continuously to the user device 132 so the user 130 can monitor the progress of the delivery agent 150. In some arrangements, the provider institution computing system 110 sends the GPS location of the delivery agent device 154 and/or the cash storage device 156 to the user device 132 at regular intervals (e.g., every five seconds, every ten seconds, every fifteen seconds, etc.).

At 638, location data of the delivery agent device 154 is received. In some arrangements, the provider institution computing system 110 provides a graphical representation of the location of the delivery agent 150 relative to the user 130 so the user can monitor the progress of the delivery agent 150.

At 640, the user 130 provides the authentication code to the cash storage device 156. In some arrangements, after the delivery agent 150 arrives at the location of the user 130, the user 130 provides the authentication code to the cash storage device 156. In some arrangements, the user enters the PIN associated with the user to receive the cash. In some arrangements, the user 130 allows the cash storage device 156 to scan a bar code or QR code provided by the provider institution computing system 110. In some arrangements, the user 130 provides a biometric code (e.g., a fingerprint, a retina scan, etc.) to the cash storage device 156. The authentication code may be directly authenticate by the cash storage device 156 in arrangements where the provider institution computing system 110 provides the cash storage device 156 with the authentication code. In some arrangements, the authentication code provided by the user 130 is sent to the authentication circuit 126, and the authentication circuit determines whether the authentication code is valid.

At 642, cash is dispensed by the cash storage device 156. In some arrangements, upon validating the authentication code of the user 130, the cash storage device 156 dispenses the amount of cash desired by the user 130.

At 644, a validation message is sent from the cash storage device 156. In some arrangements, the cash storage device 156 notifies the provider institution computing system 110 that the transaction is complete. The provider institution computing system 110 then updates information associated with the user 130 in the user account database 114 to reflect the amount of cash withdrawn by the user 130.

FIGS. 7-12 are illustrations of displays or interfaces provided by the mobile application 240 and used to facilitate a cash withdrawal and delivery. The mobile application 240 is executed on, or is accessible by, the user device 132, the delivery agent device 154, the provider institution computing system 110, and the third-party server 160.

To initiate a cash request, the user 130 opens the mobile application 240 on the user device 132. The mobile application 240 provides the display 702 for the user to enter information regarding the desired action. In arrangements where the mobile application provides for ride sharing, the user 130 may desire to be taken from a first location to a second location. In such arrangements, the user 130 selects the box 704 to request a ride. In arrangements where the user 130 does not want to go another location but is in need of cash, the user 130 selects the box 706 to request a cash delivery. In arrangements where the user 130 desires to go from a first location to a second location and is in need of cash, the user 130 selects the box 708 to request a ride and to request cash.

If the user 130 selects the box 706 to have cash delivered, the user 130 is presented with the display 802 to enter information regarding the cash delivery. For example, the user 130 enters the desired amount of cash in box 804. If the user 130 has more than one account, the user can select the account from which cash will be withdrawn in box 808 using the dropdown arrow 806. In some arrangements, the display 802 can include other options such as selecting the denominations of cash desired or selecting a desired type of currency. In some arrangements, the user 130 can also view the profiles of nearby drivers (e.g., potential delivery agents) by selecting box 810 to see if any of the nearby drivers would be preferred. After the user 130 has staged the cash delivery request, the user sends the cash delivery request to the provider institution computing system 110. The provider institution computing system 110 then sends the request to nearby potential delivery agents.

The delivery agent 150 receives notification of the delivery request submitted by the user 130 on the delivery agent device 154 via the mobile application 240. The mobile application 240 provides the display 902 for the delivery agent 150 to view the details related to the delivery request. The display 902 can include information such as the estimated time to complete the transaction and the destination address (e.g., the location of the user device 132 based on the GPS coordinates of the user device 132). The delivery agent 150 may also be able to view the profile of the user 130 by selecting box 904. The profile of the user 130 may include information regarding how many requests the user 130 has sent, how many deliveries the user 130 has cancelled, etc. The delivery agent 150 can accept the delivery request by selecting box 906, or the delivery agent 150 can reject the delivery request by selecting box 908. The result of the selection by the delivery agent 150 is then sent to the provider institution computing system 110 by the delivery agent device 154.

After the delivery agent 150 is selected (either by the user 130 or the provider institution computing system 110), the provider institution computing system 110 determines the available cash storage devices from which the delivery agent 150 can withdraw cash. In some arrangements, the provider institution computing system 110 chooses which customer payment system to use for the cash withdrawal. In some arrangements, the provider institution computing system 110 allows the delivery agent 150 to choose the customer payment system from which the cash will be withdrawn. In such arrangements, the provider institution computing system 110 sends a list of the customer payment systems from which the delivery agent 150 can choose as a list via the mobile application 240. The mobile application 240 provides the display 1002 for the delivery agent 150 to choose the desired customer payment system from which to withdraw cash. The customer payment system may be displayed as the name of the store or venue where the customer payment system is located. The delivery agent 150 can scroll through the available options using the scroll bar 910 and selects one of the options presented in boxes 904, 906, or 908. After selecting the desired customer payment system, the delivery agent 150 selects box 912 to generate a delivery route from the delivery agent device 154 to the customer payment system (e.g., the cash storage device 156) and then to the user device 132.

After the delivery agent 150 is selected, the delivery route from the delivery agent 150 to the user 130 is generated. In some arrangements, the delivery route is generated by the provider institution computing system 110 based on the locations of the delivery agent device 154 and the user device 132. In some arrangements, the locations of each of the devices is provided to another application on the delivery agent device 154 to generate the delivery route. In either case, the delivery route is displayed via the display 1100 on the mobile application 240. The display 1100 can include the total estimated time to complete the trip, a map 1102 showing the entire route including the starting point 1104 and the location 1108 of the user device 132. The map 1102 provides the location of the delivery agent vehicle 152 in real time so the delivery agent 150 can successfully navigate to the user device 132. The map 1102 may also show other information such as a speed limit indicator 1110 to notify the delivery agent 150 of the speed limit, and a next turn indicator 1112 to notify the delivery agent 150 of the next required turn to remain on the desired route.

The user 130 is able to view the progress of the delivery agent 150 throughout the route of the delivery agent 150 via the user device 132. The mobile application 240 provides a map 1404 on a display 1402 such that the user 130 can see the location of the delivery agent vehicle 152 along the cash delivery route. The cash delivery route includes the starting location 1406 and the location 1412 of the user 130, and the user 130 can view the location of the delivery agent 150 in real time as the delivery agent vehicle 152 moves along the route. The user 130 also has the option to provide additional delivery instructions by selecting the delivery instruction box 1414. The user 130 can also select the call driver box 1416 if the user desires to call the delivery agent 150 for any reason. The user 130 can also select to cancel the cash delivery request by selecting the box 1418.

When the delivery agent 150 arrives at the location of the user device 132, the identity of the user 130 must be verified before the cash storage device 156 provides the cash to the user 130. The user 130 enters authentication information (e.g., the user PIN, bar code, QR code, biometric code, etc.) into the cash storage device 156. For example, the user device 132 may display a QR code 1504 to be scanned by a scanner on the cash storage device 156. Upon scanning the QR code and validating the identity of the user 130, the cash storage device 156 provides the cash to the user 130.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present invention.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   receiving, by a provider institution computing system via a network, a cash level indicator from a mobile application provided by a third-party server, the cash level indicator indicating a value of an amount of cash stored in each of a plurality of cash storage devices, the plurality of cash storage devices receiving cash from a plurality of delivery agents, each of the plurality of cash storage devices arranged within or on a vehicle operated by a corresponding one of the plurality of delivery agents;
   receiving, by the provider institution computing system via the network, a cash request from a user device of a user;
   selecting, by the provider institution computing system, two or more cash storage devices of the plurality of cash storage devices based on the cash level indicator and location data of a plurality of delivery agent devices of the plurality of delivery agents;
   sending, by the provider institution computing system to two or more delivery agent devices corresponding to the two or more cash storage devices, a message comprising location data of the user device;
   responsive to receiving a confirmation message from each of the two or more delivery agent devices, instructing, by the provider institution computing system, the user device to display attributes of two or more delivery agents corresponding to the two or more delivery agent devices;
   generating, by the provider institution computing system, responsive to receiving a selection of a delivery agent of the two or more delivery agents from the user device, a navigation route based on a location of the user device and a location of a delivery agent device of the delivery agent;
   transmitting, by the provider institution computing system, an authentication code to the user device responsive to receiving the selection of the delivery agent;
   comparing, by the provider institution computing system, an authentication message transmitted by a respective cash storage device of the delivery agent to the authentication code transmitted to the user device to identify a match to authenticate the user device, the authentication message comprising the authentication code obtained by the cash storage device from the user device;
   transmitting, by the provider institution computing system, a verification message to the respective cash storage device of the delivery agent responsive to authenticating the user device, causing the respective cash storage device to dispense cash in accordance with the cash request; and
   providing, by the provider institution computing system, a reward to the delivery agent via the delivery agent device of the delivery agent, the reward based on the value of an amount of cash added to the cash storage device.

2. The method of claim 1, wherein the cash level indicator is related to an amount of cash received by the plurality of delivery agents from a plurality of customers.

3. The method of claim 2, wherein the third-party server is in communication with the provider institution computing system.

4. The method of claim 2, further comprising:
  determining, by the provider institution computing system, whether the delivery agent adds the amount of cash to the cash storage device; and
  in response to determining that the delivery agent adds the amount of cash to the cash storage device, determining, by the provider institution computing system, the value of the amount of cash added to the cash storage device.

5. The method of claim 1, wherein the location data of the plurality of delivery agent devices is determined based on a plurality of global positioning system (GPS) signals from the plurality of delivery agent devices.

6. The method of claim 1, wherein the cash level indicator is related to an amount of cash available in the cash storage device.

7. The method of claim 1, wherein selecting the two or more cash storage devices further comprises receiving, by the provider institution computing system, a respective message from each of the two or more cash storage devices indicating each of the two or more cash storage devices are available.

8. The method of claim 1, further comprising sending, by the provider institution computing system, the location data of the delivery agent device of the delivery agent to the user device.

9. A provider institution computing system, comprising:
  a network interface; and
  a processing circuit configured to:
    receive a cash level indicator from a mobile application provided by a third-party server, the cash level indicator indicating a value of an amount of cash stored in each of a plurality of cash storage devices, the plurality of cash storage devices receiving cash from a plurality of delivery agents, each of the plurality of cash storage devices arranged within or on a vehicle operated by a corresponding one of the plurality of delivery agents;
    receive a cash request from a user device of a user;
    select two or more cash storage devices of the plurality of cash storage devices based on the cash level indicator and location data of a plurality of delivery agent devices of the plurality of delivery agents;
    send a message to two or more delivery agent devices corresponding to the two or more cash storage devices, the message comprising location data of the user device;
    responsive to receiving a confirmation message from each of the two or more delivery agent devices, instruct the user device to display attributes of two or more delivery agents corresponding to the two or more deliver agent devices;
    generate, responsive to receiving a selection of a delivery agent of the two or more delivery agents from the user device, a navigation route based on a location of the user device and a location of a delivery agent device of the delivery agent;
    transmit an authentication code to the user device responsive to receiving the selection of the delivery agent;
    compare an authentication message transmitted by a respective cash storage device of the delivery agent to the authentication code transmitted to the user device to identify a match to authenticate the user device, the authentication message comprising the authentication code obtained by the cash storage device from the user device;
    transmit a verification message to the respective cash storage device of the delivery agent responsive to authenticating the user device, causing the respective cash storage device to dispense cash in accordance with the cash request; and
    provide a reward to the delivery agent via the delivery agent device of the delivery agent, the reward based on the value of an amount of cash added to the cash storage device.

10. The provider institution computing system of claim 9, wherein the cash level indicator is related to an amount of cash received by the plurality of delivery agents from a plurality of customers.

11. The provider institution computing system of claim 10, wherein the third-party server is in communication with the provider institution computing system.

12. The provider institution computing system of claim 11, wherein the processing circuit is configured to:
  determine whether the delivery agent adds the amount of cash to the cash storage device; and
  in response to determining that the delivery agent adds the amount of cash to the cash storage device, determine the value of the amount of cash added to the cash storage device.

13. The provider institution computing system of claim 9, wherein the location data of the plurality of delivery agent devices is determined based on a plurality of global positioning system (GPS) signals from the plurality of delivery agent devices.

14. The provider institution computing system of claim 9, wherein the cash level indicator is related to an amount of cash available in the cash storage device.

15. The provider institution computing system of claim 9, wherein selecting the two or more cash storage devices further comprises receiving a respective message from each of the two or more cash storage devices, indicating the two or more cash storage devices are available.

16. The provider institution computing system of claim 9, further comprising sending the location data of the delivery agent device of the delivery agent to the user device.

17. A system for processing cash withdrawal and delivery requests, comprising:
  a non-transitory computer-readable medium of a provider institution computing system storing computer-readable instructions such that, when executed, causes a processing circuit to:
    receive a cash level indicator from a mobile application provided by a third-party server, the cash level indicator indicating a value of an amount of cash stored in each of a plurality of cash storage devices, the plurality of cash storage devices receiving cash from a plurality of delivery agents, each of the plurality of cash storage devices arranged within or on a vehicle operated by a corresponding one of the plurality of delivery agents;
    receive a cash request from a user device of a user;
    select two or more cash storage devices of the plurality of cash storage devices based on the cash level indicator and location data of a plurality of delivery agent devices of the plurality of delivery agents;
    send a message to two or more delivery agent devices corresponding to the two or more cash storage devices, the message comprising location data of the user device;
    responsive to receiving a confirmation message from each of the two or more delivery agent devices, instruct the user device to display attributes of two or more delivery agents corresponding to the two or more deliver agent devices;

generate, responsive to receiving a selection of a delivery agent of the two or more delivery agents from the user device, a navigation route based on a location of the user device and a location of a delivery agent device of the delivery agent;

transmit an authentication code to the user device responsive to receiving the selection of the delivery agent;

compare an authentication message transmitted by a respective cash storage device of the delivery agent to the authentication code transmitted to the user device to identify a match to authenticate the user device, the authentication message comprising the authentication code obtained by the cash storage device from the user device;

transmit a verification message to the respective cash storage device of the delivery agent responsive to authenticate the user device, causing the respective cash storage device to dispense cash in accordance with the cash request; and provide a reward to the delivery agent via the delivery agent device of the delivery agent, the reward based on the value of an amount of cash added to the cash storage device.

18. The system of claim 17, wherein the cash level indicator is related to an amount of cash received by the plurality of delivery agents from a plurality of customers.

19. The system of claim 18, wherein the third-party server is in communication with the system.

20. The system of claim 19, wherein the processing circuit is configured to:

determine whether the delivery agent adds the amount of cash to the cash storage device; and in response to determining that the delivery agent adds the amount of cash to the cash storage device, determine the value of the amount of cash added to the cash storage device.

21. The system of claim 17, wherein the location data of the plurality of delivery agent devices is determined based on a plurality of global positioning system (GPS) signals from the plurality of delivery agent devices.

22. The system of claim 17, wherein the cash level indicator is related to an amount of cash available in the cash storage device.

23. The system of claim 17, wherein selecting the two or more cash storage devices comprises receiving a respective message from each of the two or more cash storage devices, indicating the two or more cash storage devices are available.

24. The system of claim 17, further comprising sending the location data of the delivery agent device of the delivery agent to the user device.

* * * * *